United States Patent
Randle-Conde et al.

(10) Patent No.: US 12,505,145 B2
(45) Date of Patent: Dec. 23, 2025

(54) METHOD OF CLASSIFYING A VERY LARGE CORPUS OF DOCUMENTS

(71) Applicant: HANZO LTD, Leeds (GB)

(72) Inventors: Aidan Randle-Conde, Manchester (GB); Jimmie Weiss, Bad Rappenau (DE); Dave Ruel, Portland, OR (US); Julien Masanes, Paris (FR)

(73) Assignee: HANZO LTD, Leeds (GB)

( * ) Notice: Subject to any disclaimer, the term of this patent is extended or adjusted under 35 U.S.C. 154(b) by 174 days.

(21) Appl. No.: 18/510,121

(22) Filed: Nov. 15, 2023

(65) Prior Publication Data
US 2025/0156468 A1    May 15, 2025

(51) Int. Cl.
*G06F 16/355*    (2025.01)
*G06F 40/205*    (2020.01)
*G06F 40/40*    (2020.01)

(52) U.S. Cl.
CPC .......... *G06F 16/355* (2019.01); *G06F 40/205* (2020.01); *G06F 40/40* (2020.01)

(58) Field of Classification Search
CPC .... G06F 16/258; G06F 16/33; G06F 16/3329; G06F 16/3344; G06F 16/3347; G06F 16/353; G06F 16/355; G06F 16/93; G06F 40/205; G06F 40/226; G06F 40/284; G06F 40/30; G06F 40/35; G06F 40/40; G06F 40/56; G06F 16/248; G06F 16/285; G06F 16/35; G06F 16/367; G06F 16/953; G06F 18/2178; G06F 40/216; G06F 40/279; G06F 40/44; G06N 3/047; G06N 5/04; G06N 20/00; G06N 3/0464; G06N 20/20; G06V 10/82; G06V 30/418; G06V 30/40; H04L 51/216

See application file for complete search history.

(56) References Cited

U.S. PATENT DOCUMENTS

| | | | | |
|---|---|---|---|---|
| 6,415,250 | B1 * | 7/2002 | van den Akker | G06F 40/216 704/9 |
| 6,640,224 | B1 * | 10/2003 | Chakrabarti | G06F 16/355 707/999.005 |
| 7,747,427 | B2 * | 6/2010 | Lee | G06F 40/44 704/4 |
| 8,214,363 | B2 * | 7/2012 | Chaudhary | G06F 16/953 707/769 |
| 8,327,265 | B1 * | 12/2012 | Vogel | G06F 40/30 704/4 |
| 11,436,529 | B1 * | 9/2022 | Londeree | G06F 16/353 |

(Continued)

*Primary Examiner* — Gerald Gauthier
(74) *Attorney, Agent, or Firm* — Oliff PLC (57) ABSTRACT

A method for sorting candidate documents into several sets associated with a reference document, each document stored by a client device memory, wherein the method includes a device processor performing for each reference document, generating a first prompt for a first large language model requesting generation of at least one question determining the relevance of a candidate document to a reference document; (b) for each candidate document, generating at least one second prompt for a second large language model requesting the answer to at least one reference question; assigning each candidate document to the set associated with a reference document as a function of the value(s) that has been received for a second prompt containing a reference question associated to the reference document.

12 Claims, 2 Drawing Sheets

(56) References Cited

U.S. PATENT DOCUMENTS

| | | | |
|---|---|---|---|
| 11,860,914 B1* | 1/2024 | Qadrud-Din | G06F 40/56 |
| 11,861,321 B1* | 1/2024 | O'Kelly | G06F 16/33 |
| 11,972,223 B1* | 4/2024 | DeFoor | G06N 20/00 |
| 12,197,483 B1* | 1/2025 | Shmukler | G06F 40/284 |
| 2004/0088157 A1* | 5/2004 | Lach | G06F 40/30 |
| | | | 704/9 |
| 2004/0148155 A1* | 7/2004 | Vogel | G06F 16/367 |
| | | | 704/9 |
| 2005/0114327 A1* | 5/2005 | Kumamoto | G06F 16/3344 |
| 2006/0155662 A1* | 7/2006 | Murakami | G06F 16/35 |
| | | | 707/E17.089 |
| 2007/0162272 A1* | 7/2007 | Koshinaka | G06F 16/35 |
| | | | 707/E17.089 |
| 2009/0274376 A1* | 11/2009 | Selvaraj | G06F 40/30 |
| | | | 382/224 |
| 2010/0299139 A1* | 11/2010 | Ferrucci | G06F 16/3329 |
| | | | 704/E11.001 |
| 2012/0278266 A1 | 11/2012 | Naslund et al. | |
| 2013/0138430 A1* | 5/2013 | Eden | G06F 40/40 |
| | | | 704/9 |
| 2014/0379761 A1* | 12/2014 | Adamson | G06F 16/258 |
| | | | 707/811 |
| 2015/0154305 A1* | 6/2015 | Lightner | G06F 16/3347 |
| | | | 707/726 |
| 2018/0025075 A1* | 1/2018 | Beller | G06F 16/3329 |
| | | | 707/769 |
| 2020/0142856 A1* | 5/2020 | Neelamana | G06F 18/2178 |
| 2020/0143257 A1* | 5/2020 | Neelamana | G06F 16/248 |
| 2021/0165807 A1* | 6/2021 | Asaf | G06F 16/285 |
| 2021/0248420 A1* | 8/2021 | Zhong | G06V 10/82 |
| 2021/0390297 A1* | 12/2021 | Sakaguchi | G06F 40/30 |
| 2021/0398025 A1* | 12/2021 | Yamamoto | G06N 20/00 |
| 2022/0058496 A1* | 2/2022 | Rusk | G06N 5/04 |
| 2022/0108126 A1* | 4/2022 | Schieber | G06N 20/00 |
| 2022/0414369 A1* | 12/2022 | Makani | G06V 30/418 |
| 2023/0015667 A1* | 1/2023 | Stadermann | G06F 40/279 |
| 2023/0078263 A1* | 3/2023 | Seledkin | H04L 51/216 |
| | | | 707/737 |
| 2023/0196017 A1* | 6/2023 | Geiman | G06F 16/353 |
| | | | 704/9 |
| 2023/0315790 A1* | 10/2023 | Zeng | G06F 16/93 |
| | | | 707/737 |
| 2024/0095460 A1* | 3/2024 | Xu | G06F 40/30 |
| 2024/0160900 A1* | 5/2024 | Smith | G06N 3/047 |
| 2024/0249191 A1* | 7/2024 | Bowman | G06N 20/00 |
| 2024/0289561 A1* | 8/2024 | Qadrud-Din | G06F 40/226 |
| 2024/0356875 A1* | 10/2024 | Medalion | G06F 40/35 |
| 2024/0386037 A1* | 11/2024 | Chockalingam | G06F 40/40 |
| 2024/0394286 A1* | 11/2024 | Honke | G06F 40/284 |
| 2025/0005058 A1* | 1/2025 | Khosla | G06F 16/3344 |
| 2025/0005276 A1* | 1/2025 | Bhat | G06F 40/30 |
| 2025/0156468 A1* | 5/2025 | Randle-Conde | G06F 40/205 |

* cited by examiner

METHOD OF CLASSIFYING A VERY LARGE CORPUS OF DOCUMENTS

FIELD OF THE INVENTION

The present invention relates to the field of artificial intelligence, in particular natural language processing and the use of large language models, and precisely to a method for sorting a plurality of candidate documents into several sets each associated with a reference document.

BACKGROUND OF THE INVENTION

In today's highly collaborative environment, businesses generate a high volume of diverse unstructured electronic content including messages, SMS text messages, email, documents, spreadsheets, presentations, graphs, charts, product mockups, etc. Many modern businesses deploy and work with a multitude of SaaS (Software as a Service), cloud-based applications to generate the aforementioned content. A high percentage of the content contains text-based information which, when ingested and indexed, becomes a searchable document.

All these documents shall be somehow picked and archived in an ordered fashion so as to be easily accessible when necessary.

This involves a classification of the document based on its content, which is usually made manually by the users, which is time consuming and prone to errors.

Automatic classification is more complex. Some documents may include for instance a case number that can be used as a tag, or be linked to another document which is already classified (for instance an e-mail and its reply), but there are still lots of documents which lack these hints.

Consequently, some solutions based on Artificial Intelligence (AI) and in particular Natural Language Processing (NLP) have been proposed.

TAR (Technology Assisted Review) is a process of having software automate the classification of documents based on expert reviewer input, in an effort to expedite the organization and prioritization of the documents.

TAR aims to classify documents as relevant to a given set of criteria and are normally deployed only when large volumes (~500 k+ documents) of content are part of the review set. TAR is an iterative process with each iteration resulting in a new model:
  A subsample of documents is selected from the corpus using some strategy (e.g. random sampling).
  The operator classifies the documents in this subsample.
  The classified documents are used to train up a machine learning algorithm to provide a new model.

TAR works by repeating the above workflow until an end condition is met. This end condition could be determined by the number of iterations performed, the accuracy of the model, or some other requirement. It is typical to stop iterations when the performance of the model no longer improves by a significant amount, which often happens after a few iterations. The disadvantage of further iterations is the additional time commitment required.

The problem is that due to iterations, TAR is highly time-consuming, and can be biased and variable due to the human input, and whether the subsample of the dataset is representative of the whole dataset.

To reduce the drawbacks of TAR, it is often used in conjunction with CAL (Continuous Active Learning), which is a process that learns from the actions of the operator. As an operator classifies documents, the decisions are recorded and a training dataset is accumulated. Periodically, a new model is trained up using this training dataset. This periodic retraining may be automated. CAL can be used throughout the rest of the review and relevance decision making.

Thus, CAL requires significant human intervention, which is not always possible, and adds even more possible bias.

The present invention improves this situation, and propose a new solution which is highly accurate, not particularly time-consuming, and fully avoids intrapersonal variation and bias.

SUMMARY OF THE INVENTION

According to a first aspect, the present invention proposes a method for sorting a plurality of candidate documents into several sets each associated with a reference document, each candidate and reference document being stored by a memory of a client device, wherein the method comprises performing, by a processor of said device, steps of:
  (a) for each reference document
    Generating a first prompt for a first large language model requesting the generation of at least one question aiming to determine whether a candidate document is relevant to the content of said reference document, said first prompt containing a text of the reference document;
    Transmitting the generated first prompt to a first server implementing the first large language model;
    receiving in reply to the first prompt at least one reference question corresponding to the reference document;
  (b) for each candidate document,
    generating at least one second prompt for a second large language model requesting the answer to at least one of the reference questions for said candidate document, said second prompt containing the reference question and a text of the candidate document;
    Transmitting each generated second prompt to a second server implementing the second large language model;
    receiving in reply to each second prompt a value representative of the answer to the reference question;
  (c) assigning each candidate document to the set associated with a reference document as a function of the value(s) that has been received for a second prompt containing a reference question associated to said reference document.

According to advantageous and not limitative features:

Generating a first prompt includes inserting the text of said reference document into a generic template of first prompt, and generating a second prompt includes inserting the reference question and the text of said candidate document into a generic template of second prompt.

The first prompt requests the generation of a predefined number of questions, preferably at least 5, said predefined number of reference questions corresponding to the reference document being received in reply to the first prompt.

Step (a) comprises merging two reference questions corresponding to the same reference document into one if it is possible.

The first large language model has more parameters, preferably at least 5 times more parameters, than the second large language model.

Step (a) previously comprises parsing said reference document with the first large language model so as to identify a summary part of the reference document, the text of the reference document contained in the first prompt being said summary part of the reference document.

Step (a) previously comprises parsing said reference document with the first large language model so as to identify parts of the reference documents, each reference question received for the reference document being mapped on to one or more of said parts of the reference document.

Said text of the candidate document contained in the second prompt is the entire candidate document if it fits within performant context-window size limits of the second large language model, or else a chunk of the candidate document fitting within performant context-window size limits of the second large language model.

The second prompt contains several entire candidate documents at once if it fits within performant context-window size limits of the second large language model.

Step (b) comprises, if the value replied to a second prompt containing several entire candidate document is representative of the answer yes, restarting step (b) with several second prompts containing only a part of said candidate document.

Said value representative of the answer to the reference question is a boolean or a score representative of the probability that the answer to said reference question is yes.

According to a second aspect, the invention proposes a client device for sorting a plurality of candidate documents into several sets each associated with a reference document, comprising a memory storing each candidate and reference document, wherein the method comprises a processor configured to perform:
(a) for each reference document
Generating a first prompt for a first large language model requesting the generation of at least one question aiming to determine whether a candidate document is relevant to the content of said reference document, said first prompt containing a text of the reference document;
Transmitting each generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for said candidate document, said second prompt containing the reference question and a text of the candidate document;
Transmitting each generated second prompt to a second server implementing the second large language model,
receiving in reply to each second prompt a value representative of the answer to the reference question;
(c) assigning each candidate document to the set associated with a reference document as a function of the values(s) that has been received for a second prompt containing a reference question associated to said reference document.

According to a third aspect, the invention proposes a non-transitory computer-readable medium comprising program code instructions stored thereon for implementing a method for sorting a plurality of candidate documents into several sets each associated with a reference document, each candidate and reference document being stored by a memory of a client device, wherein the method comprises performing, by a processor of said device, steps of:
(a) for each reference document
Generating a first prompt for a first large language model requesting the generation of at least one question aiming to determine whether a candidate document is relevant to the content of said reference document, said first prompt containing a text of the reference document;
Transmitting each generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for said candidate document, said second prompt containing the reference question and a text of the candidate document;
Transmitting each generated second prompt to a second server implementing the second large language model,
receiving in reply to each second prompt a value representative of the answer to the reference question;
(c) assigning each candidate document to the set associated with a reference document as a function of the values(s) that has been received for a second prompt containing a reference question associated to said reference document.

BRIEF DESCRIPTION OF THE DRAWINGS

The above aspects and features of the present invention will be more apparent from the following description of an exemplary embodiment of the present invention with reference to the accompanying drawings, in which.

DETAILED DESCRIPTION OF EXEMPLARY EMBODIMENTS

General Architecture

Figure 1:
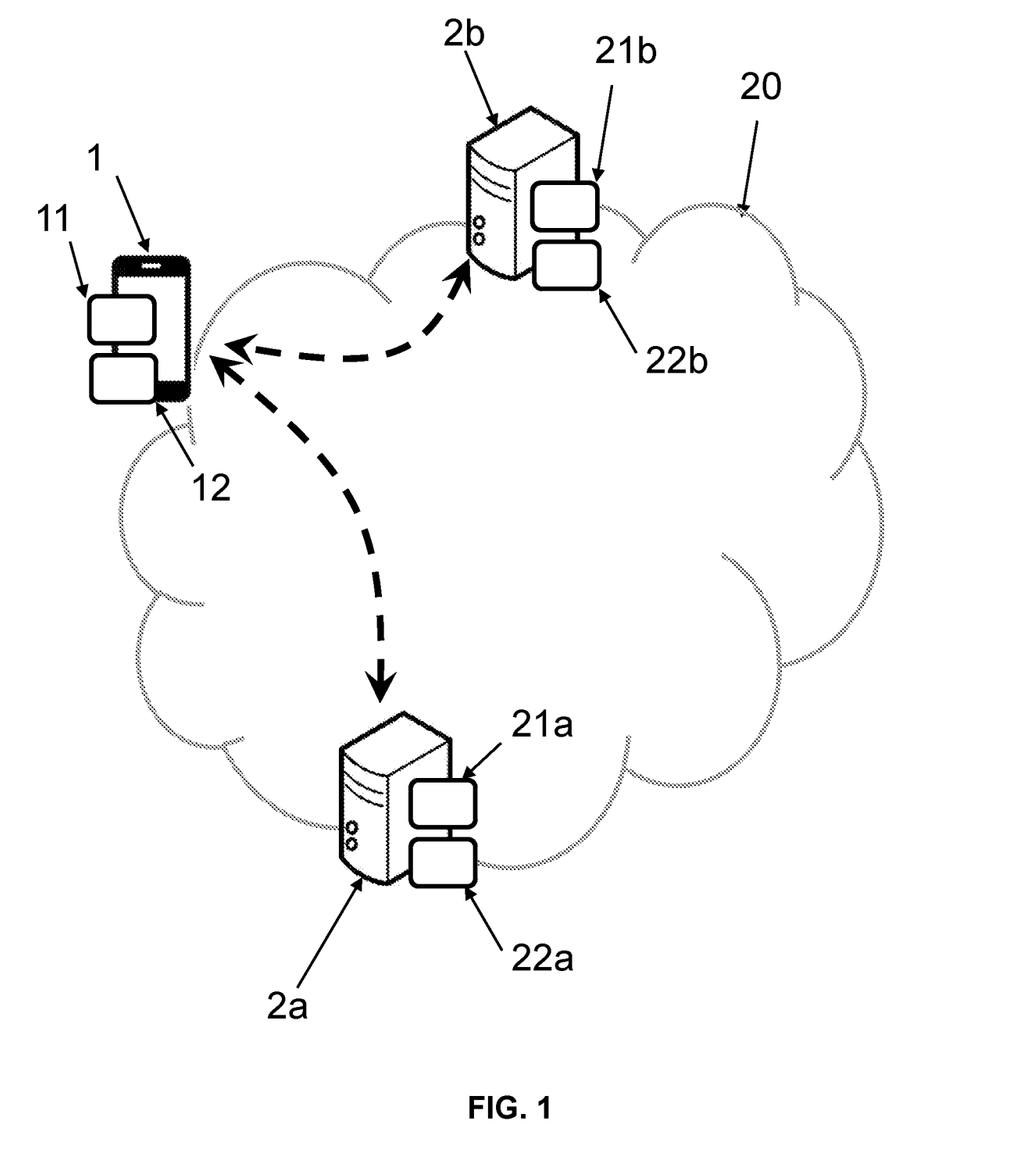
FIG. 1 is a diagram of a system for implementing the process according to the invention.

According to a first aspect, the present invention is directed to a method for sorting a plurality of candidate documents into several sets each associated with a reference document, in such a system as represented by FIG. 1.

The documents can be of any nature (e-mails, messages, letters, detailed reports, documentations, etc.), structured or not, provided that their textual content is machine-encoded, in natural language, i.e. "searchable". It is possible that the documents comprise a non-textual content, such as image, but it will not be taken into account.

For instance, the four following chat messages could be four candidate documents:

[12:00] Alice: I don't think we have the reports on the emissions yet, do we?

[12:05] Bob: Yes we do. Last quarter we released 28% more $CO_2$ than permitted. This was mostly because of the problems with the plant in Ohio.

[12:10] Alice: Oh no, we need a plan to deal with this! We can't be releasing that much CO2.

[12:15] Bob: Not my problem, my vacation starts in just under five hours!

We have "reference" and "candidate" documents. The candidate documents are simply documents to be sorted. A candidate document is sorted into the set associated to a reference document if it is related to this reference document, meaning that all candidate documents of a same set are related together.

By reference document, or "supporting document", it is meant a meaningful document, selected as being representative of a category. Thus, each reference document is associated to a set of candidate documents, but more specifically the reference document define said set. Generally, the reference documents are detailed documents such as summaries or documentations.

It is assumed that a collection of reference documents is available. For instance, in the case of sorting documents related to legal matter cases, the reference documents could simply be all the case summaries. Note that the present method works regardless the collection of reference documents, with is simply to be seen as an input. In terms of number, the present method is very effective and we may have up to a few tens of reference documents and more than several hundreds of thousands (possibly millions, or even hundreds of millions) of candidate documents. In the following description the number of reference documents will be referred to Nr and the number of candidate documents will be referred to as Nc, with Nc>>Nr (generally at least 10000 times higher, preferably at least 1000000 times higher).

The candidate documents are "sorted into several sets", i.e. each is assigned to at least one of the sets. The sets can form a partition of a global set of all candidate documents (referred to as "corpus"), but it is be understood that a candidate document may be related to several reference documents, and thus be assigned to several sets (in other words the sets may be overlapping). Each set defines a category, i.e. all the candidate documents of a set and the corresponding reference document are semantically linked. In a preferred embodiment, a candidate document could be "relevant", "note relevant" or even "potentially relevant" to the content of a reference document, so that we could define up to three sets associated to each reference document.

In this embodiment, if we have 3 reference documents R1, R2 and R3, and a corpus S of 6 candidate documents C1 . . . C6 (i.e. S={C1, C3, . . . C6}), we have nine sets S1+, S2+, S3+ (relevant to the i-th reference document), S1?, S2?, S3? (potentially relevant to the i-th document), S1−, S2− and S3− (non relevant to the i-th document) such that ∀i Si+∪Si?∪Si−=S, and ∀i Si+∩Si?=Si+∩Si−=Si?∩Si−=∅.

Suppose that:
C1 is only relevant to R1
C2 is only relevant to R2
C3 is relevant to R3 and potentially relevant to R1
C4 is potentially relevant to R1
C5 is relevant to R1
C6 is potentially relevant to R1 and R2.

Thus S1+={C1, C5}, S1?={C3, C4, C6}, S1−={C2}, S2+={C2}, S2?={C6}, S2−={C1, C3, C4, C5}, S3+={C3}, S3?=∅ and S3−={C1, C2, C4, C5, C6}.

Note that we do not have a mere abstract classification, but each candidate document is for instance physically moved to a specific memory location corresponding to the set(s), or positively labelled (for instance tagged with metadata designating this (ese) set(s)).

As shown in FIG. 1, the system comprises a client device 1 (i.e. a terminal) such as a workstation or a smartphone for performing the method, presenting an interface and via which the user will be able to interact, and a first and/or a second server(s) 2a, 2b for respectively implementing and first and/or a second large language model(s) (LLM) that will be described below. It is to be understood that the client device 10 is connected to the first and/or second server(s) 2a, 2b, for example via a network 20 such as the Internet.

The terminal 1 and the first/second servers 2a, 2b comprise data processing means 11, 21a, 21b such as a processor of any kind, and data storage means 12, 22a, 22b i.e. a memory. Each candidate and reference document is stored by the memory 12 of the client device. The memory 12 may actually be a remote memory, for instance in the cloud, but under control of the device 10.

Note that the first and second servers 2a, 2b may actually be the same server (and the first and second LLMs be the same one).

Method

Figure 2:
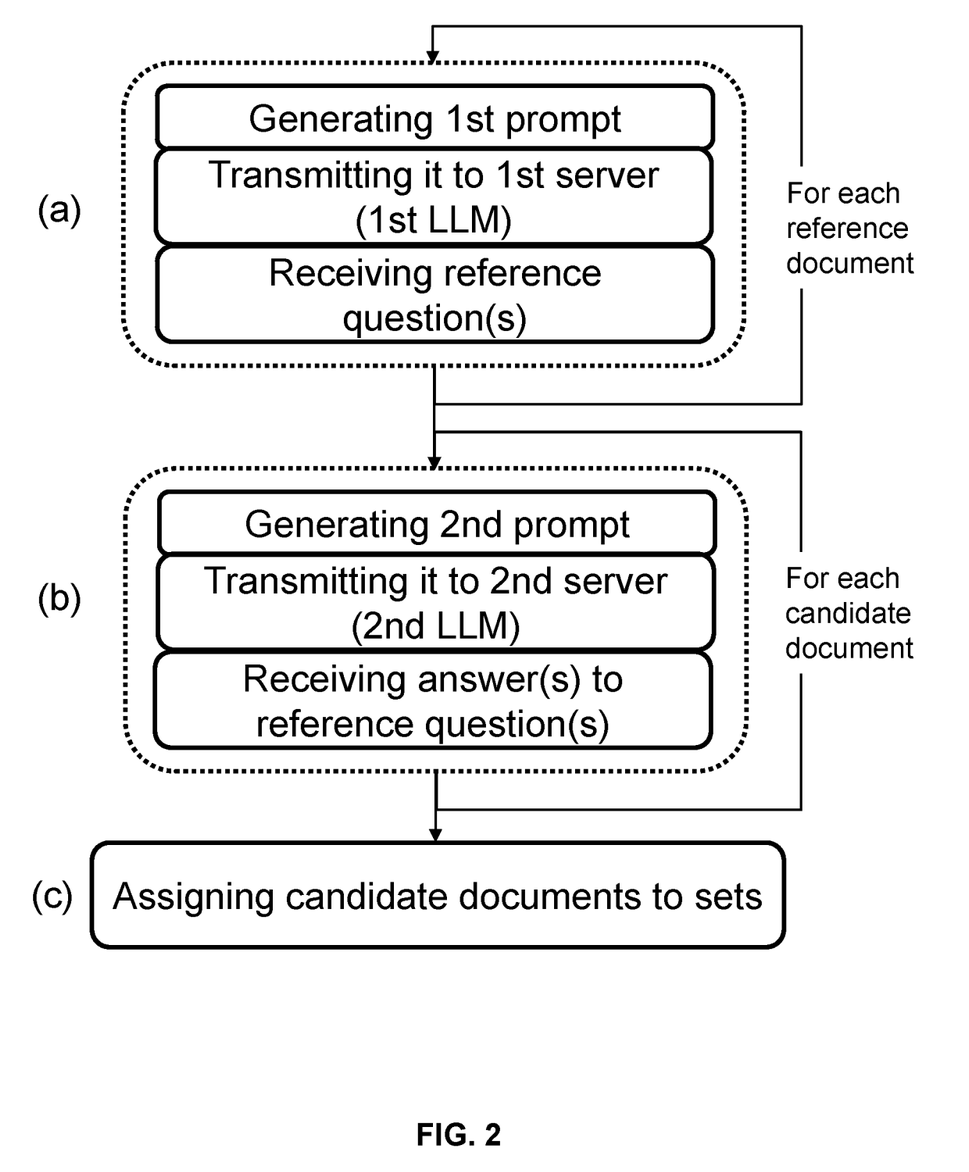
FIG. 2 is a flow chart illustrating the steps in one embodiment of the process according to the invention.

With reference to FIG. 2, the present method is implemented by the data processing means 11 of the client device, and begins with a step (a) of generating reference questions for each reference document.

The idea is, instead of directly trying to match reference and candidate documents, to astutely use LLMs to convert the reference documents into reference questions that may directly be asked to easily and objectively classify the candidate document. In other words, said reference questions directly allow to assess relevance of a candidate document. That avoids any need for human intervention, while enabling a very high efficiency: generating the questions is a complex task, but the duration of this step only depends from the number of reference documents, which is not very high, independently from the number of candidate documents. These reference questions are binary questions (i.e. "yes-no" question, and not for instance open questions).

In particular, this step (a) comprises three substeps performed (at least once) for each reference document:

Generating a first prompt for a first large language model requesting the generation of at least one question aiming to determine whether a candidate document is relevant to the content of said reference document (referred to as reference question(s)), said first prompt containing a text of the reference document (i.e. at least a part of the reference document);

Transmitting the generated first prompt to the first server 2a implementing the first large language model;

Receiving (from said first server 2a) in reply to the first prompt at least one reference question corresponding to the reference document.

A "prompt" is a textual request of a generative language model such as a LLM, which is a type of artificial intelligence model well known to the skilled person. In particular, the LLM receives said prompt as input, and generates an output text (hence the "generative language model").

Said first/second LLMs are designated as "large" because of a high number of parameters (at least several billion), capable of understanding natural language. The first LLM can be referred to as "Major LLM", while the second LLM can be referred to as "Minor LLM", because the first one preferably has more parameters than the second, typically at least twice (advantageously at least 5 times, more advantageously at least 50 times, and even more advantageously at least 500 times) more parameters, than the second one. For example, the first LLM may have more than 50 billion parameters (possibly more than 1 trillion parameters) while the second LLM may have less than 20 billion parameters. Note that the number of parameters of LLMs is rapidly increasing, so that these numbers may change.

The first and/or second LLMs are advantageously any transformer-based model such as generative pre-trained transformer (GPT) type models. For example, the following models may be used: GPT-4, PaLM, LaMDA, LLAMA, BLOOM, T5, etc. In an embodiment, GPT-4 is used as the first LLM (1.7 trillion parameters) and FLAN-T5-XL is used as the second LLM (3 billion parameters). Again, new models of LLMs are appearing, so that the present invention will not be limited to any specific type of LLM, and the skilled person will be able to choose the optimal models based on the resources available and the amount of documents.

Note that the first and second LLM could be the same LLM, of even the second LLM to have more parameters than the first LLM, even if it is not optimal as it will be explained.

As mentioned, said first prompt contains a text of the reference document, either the entire reference document or at least one meaningful section of the reference document, i.e. a part, in particular a summary part. By "meaningful" section, it is meant a section efficiently expressing the content of the document. Note that there may be several meaningful sections, and either a single first prompt be generated and executed for all meaningful sections at once (they are all included into the same prompt), or different first prompts are generated and executed for these different meaningful section, in order to have more questions. That may be useful in the case wherein a single reference document has several subjects.

To this end, step (a) advantageously previously comprises parsing said reference document with the first large language model so as to identify said meaningful section(s) of the reference document. Note that this extraction of the summary part could be directly performed thanks to the first LLM (by directly requesting it using a dedicated prompt), or even, if there is no summary part, said summary could be generated using the LLM from the reference document.

The first prompt is preferably generated from a generic template of first prompt, i.e. a "blank" prompt (or "skeleton"), wherein information can be inserted, in particular a text of said reference document (preferably said meaningful part). The template of first prompt (and thus ultimately the first prompt) comprises a sentence defining that the desired action of the first LLM is the generation of said at least one reference question (aiming to determine whether a candidate document is relevant to the content of said reference document).

Note that the first prompt may further request:
the generation of a predefined number of questions, preferably at least 5; and/or
The generation of questions have a complexity adjusted, in particular by specifying a "reading age"

In a preferred embodiment, the following structure of a first prompt can be used:
"S
I1: T
I2:", wherein S is the sentence (possibly specifying said number of questions and/or reading age), I1 a first identifier specifying that the next part is said text of the reference document, T said text, and I2 another identifier specifying that the question(s) is (are) now expected.

As an example, the following first prompt template may be used:

Please write a list of {n_questions} different Yes or No questions to help determine if a document is relevant to a given description of events. The questions must be simple enough for a person with an age of {reading_age} years to understand.
DESCRIPTION: {event_description}
QUESTIONS:

From this example, the following first prompt can be generated:
Please write a list of 2 different Yes or No questions to help determine if a document is relevant to a given description of events. The questions must be simple enough for a person with an age of 12 years to understand.
DESCRIPTION: In violation of environmental regulations, too much carbon dioxide was released by a facility in Ohio.
QUESTIONS:

Step (a) now comprises the transmission of the generated first prompt to the first server implementing the first LLM, for this first prompt to be executed by the first LLM, and then the reception (in reply) of at least one reference question (or the predefined number) corresponding to the reference document.

A typical response to the previous example of first prompt could read:
1. Do the following messages describe an excessive release of carbon dioxide?
2. Do the following messages discuss any failure to comply with environmental regulations?

In addition to questions, the first prompt could request the further generation of keywords which may also be used to determine whether a candidate document is relevant to the content of said reference document.

Note that further questions and/or keywords could be added by an operator to the list of generated reference questions.

If some questions have been generated from only a specific meaningful section of the reference document, they are preferably mapped on to said parts of the reference document (as these questions are relevant to the reference document, but actually specifically relevant to said section of the reference document).

Alternatively or in addition, all questions (even if not generated from only a part of the reference document) can still be mapped to various parts of the reference document, in particular by simply comparing the questions to each given part using the first LLM to determine if the question is relevant to this part.

Preferably, step (a) comprises merging two reference questions corresponding to the same reference document into one if it is possible. The idea is to "deduplicate" reference questions which may be redundant if the generation of too many questions is requested, so as to limit the final number of questions and speed up the method.

To this end, pairs of reference questions can be compared. If a pair of questions can be combined into a single question, they are combined, with the mappings updated to reflect the meaningful sections. This process is repeated iteratively until an acceptable number of questions is reached. Said acceptable number of questions will depend upon multiple factors, including the number of documents to process, the complexity of the supporting documents, the time available to process all the documents, and the amount of time allocated to reviewing the questions. It may be predefined. A typical range of acceptable numbers of reference questions would be 5-50 questions.

In the case of keywords, a single keyword may appear for multiple sections of a reference document, so keywords can also be deduplicated and mapped back to the appropriate sections. The keywords may be further grouped into semantically similar groups, and even converted into one or several questions with wording equivalent to the following: "Does the following document contain content relevant to the given list of keywords?".

At this stage, the method has automatically created a list of questions to ask across the corpus of candidate documents as it is ingested into the system. In certain circumstances (typically when the number of CPU hours required to process the corpus is longer than the amount of real time available), the corpus can be split up arbitrarily to allow for parallel processing for productivity purposes.

The method then comprise a step (b) of applying at least one question to each candidate document. Thus if we have at least Nc questions which are asked. Preferably, at least one question (and possibly each generated question) associated to each reference question is applied to each candidate document, which leads to Nc*Nr questions, and up to n_questions*Nc*Nr question being asked. To sum up, the total number of questions asked is O(Nc*Nr).

To this end, this step (b) comprises also three substeps performed (at least once) for each candidate document:
  generating at least one second prompt for a second large language model requesting the answer to at least one of the reference questions for said candidate document, said second prompt containing the reference question and a text of the candidate document (i.e. at least a part of the candidate document);
  Transmitting each generated second prompt to a second server implementing the second large language model;
  receiving in reply to each second prompt a value representative of the answer to the reference question, which actually assesses the relevance of the candidate document to the content of said reference document associated to the reference question (as it will be seen, said value is typically either the direct answer to the question, i.e. a Boolean [YES/NO], or a score);

To rephrase, if the reply to a reference question for a candidate document is YES, it means that the candidate document is relevant to the content of the reference document associated to the reference question (i.e. the reference document from which this question has been generated).

Said step (b) is performed using the second LLM, i.e. the Minor LLM, because answering a question is far simpler than generating the question. And the number of occurrences of step (b) (O(Nc*Nr)) is far higher than the occurrences of step (a) (O(Nr)), hence the strong interest of choosing two distinct LLMs among which a Major LLM as first LLM (slow but able to perform complex tasks) and a Minor LLM as second LLM (faster but for simpler tasks).

Like the first prompt, a second prompt contains a text of the candidate document, either the entire candidate document or at least one part of the candidate document, referred to as a chunk as the idea is not to identify a meaningful part (given the high number of candidate documents, that would be too costly), but simply the biggest part of the candidate document fitting within performant context-window size limits of the second large language model. Indeed, as the second LLM is generally a Minor LLM, it has stricter size limits than the first LLM. By "performant context-window size limits", it is meant size limits given an intended performance of the LLM, which are lower than the actual size limits. For instance, a LLM such as GPT-4 has a limit of approximately 4000 tokens, and it may be decided to choose a performant context-window limit of 3000 token in order to prevent from a drop in accuracy.

Anyway, lots of candidate documents are very short chat messages that largely fits within size limits, so that they could be entirely included.

Note that the second prompt could even contain several entire candidate documents at once if it fits within performant context-window size limits of the second large language model, so as to sort them all at once. It will be explained below how the method is adapted in the case of several candidate message processed at once.

The second prompt is preferably again generated from a generic template of second prompt, wherein information can be inserted, in particular a text of said candidate document (from a chunk to several entire candidate documents at once) and at least one reference question associated to a given reference document. The template of second prompt (and thus ultimately the second prompt) comprises a sentence defining that the desired action of the second LLM is answering to the included reference question(s) for said candidate document.

Note that the first prompt may further request the nature of the expected output, i.e. said value representative of the answer to the reference question: it may be defined that a boolean is expected (the answer of the question(s) is YES or NO) or a score, in particular a percentage of confidence (0 if the answer to the question is definitely NO, 100 if the answer to the question is definitely YES, and any value in between). In the case of several questions in the same second prompt, a rule can be defined so as to combine the different values (a majority vote, an average value, etc.), or even to specify that a collection of values can be replied if not unanimous.

In a preferred embodiment, the following structure of a first prompt can be used:
  "S
  I1: Q
  I2: T
  I3:", wherein S is the sentence (possibly specifying the nature of the value to be outputted), I1 a first identifier specifying that the next part is the reference question(s), I2 a second identifier specifying that the newt part is said text of the candidate document(s), T said text, and I3 another identifier specifying that the value is now expected.

As an example, the following second prompt template may be used:
  Answer the following question with a "Yes" or "No".
  QUESTION:
  DOCUMENT:

Referring to the previous example of first prompt and the received reference questions, the following second prompt could be generated:
  Answer the following question with a "Yes" or "No".
  QUESTION: Do the following messages describe an excessive release of carbon dioxide?
  DOCUMENT:
  [12:00] Alice: I don't think we have the reports on the emissions yet, do we?
  [12:05] Bob: Yes we do. Last quarter we released 28% more CO2 than permitted. This was mostly because of the problems with the plant in Ohio.
  [12:10] Alice: Oh no, we need a plan to deal with this! We can't be releasing that much CO2.
  [12:15] Bob: Not my problem, my vacation starts in just under five hours!

ANSWER:
A typical response would be:
Yes.

We note that several candidate messages at once where included. In such case, step (b) comprises, if the value replied to a second prompt containing several entire candidate document is representative of the answer yes (i.e. directly "yes" or a score representative of a high confidence), restarting step (b) with several second prompts containing only some of said several candidate documents (with the same reference question(s)).

Indeed, the second LLM considers the plurality of candidate documents included in the second prompt as a single large candidate document. And if at least one is relevant to a reference document, the whole plurality is automatically relevant to this reference document. So if the first answer is yes, it means that at least one of the included candidate documents is relevant, and it has to be found. However, if the value replied to the second prompt containing several entire candidate document is representative of the answer no (i.e. the reply is no), it automatically means that none of the included candidate documents if relevant. Note that a dichotomous strategy may be applied: if the initial second prompt contains k candidate documents, if the reply is yes, two new second prompts containing k/2 candidate documents can be generated, etc.

In our example, the response is "yes" so that at least one candidate document is relevant so, they have to be tested independently:

New second prompt for the second candidate message
Answer the following question with a "Yes" or "No".
QUESTION: Do the following messages describe an excessive release of carbon dioxide?
DOCUMENT:
[12:05] Bob: Yes we do. Last quarter we released 28% more CO2 than permitted. This was mostly because of the problems with the plant in Ohio.
ANSWER:
Response:
Yes.
New second prompt for the fourth candidate message
Answer the following question with a "Yes" or "No".
QUESTION: Do the following messages describe an excessive release of carbon dioxide?
DOCUMENT:
[12:15] Bob: Not my problem, my vacation starts in just under five hours!
ANSWER:
Response:
No.

Note that in any case step (b) may also comprises, if the value replied to a second prompt containing an entire candidate document is representative of the answer yes, restarting step (b) with several second prompts containing only a part of said candidate document.

This allows the process to generate granular labels about which "snippet(s)" in the candidate document should be labeled as relevant. If no snippets are found to be relevant, contiguous subsets of snippets (called "partitions") are considered, and second prompts can be generated for each partition. If a partition is found to be relevant, all snippets in that partition are labeled as relevant. If no partitions are found to be relevant, all snippets in the chunk can be labeled as "potentially relevant".

At this stage, we have a collection of reply values each associated to a pair of a reference document and a candidate document (at least one for each candidate document), possibly several for a pair if there were more than one question reference question generated for each reference document, and if second prompts have been generated for several reference questions associated to the same reference document).

In a final step (c), the method comprises assigning each candidate document to the set associated with a reference document as a function of the values(s) that has been received for a second prompt containing a reference question associated to said reference document.

Various techniques can be used here, depending on the nature of outputted values.

If they are binary, it may be assumed that if the reply for at least one reference question (preferably a majority, and even preferably all) of the reference questions associated to a given reference document is yes, then the corresponding candidate document can be assigned to the set associated with a reference document (in particular the set of "relevant" document or the set of "potentially relevant" documents if there are such sets, for instance as a function of the number of answers yes). If the reply for each reference question of the reference questions associated to a given reference document is no, then the corresponding candidate document can be assigned to another possible set of "non-relevant" documents for the reference document.

In case of scores, thresholds may be used: for instance the average score is computed (among reference questions associated to the reference document), and this score is compared to one of several thresholds, for instance 75% to be considered as relevant or 50% to be considered as potentially relevant. Alternatively, the maximum (or minimum value) of the scores could be compared to another thresholds.

Note that there may be a hierarchy between reference questions: the values replied some of them, deemed to be more accurate, are first used to attempt the sorting. In case of a doubt, the values replied for further questions are then taken into account. In such an embodiment, steps (b) and (c) may be performed simultaneously.

In particular, to determine said hierarchy between questions, a "unique sensitivity" of a reference question may be defined as a ratio between the number of candidate documents determined to be relevant by only that question, and the total number of candidate documents determined to be relevant by that question. For example, a reference question which labels 100 candidate documents as relevant, of which 5 were labeled relevant by only that question, would have a unique sensitivity of 5%. After sorting a sufficiently large number of candidate documents, the unique sensitivity of each question is calculated. If a reference question has zero unique sensitivity, it may be decided that the values replied for this reference question are to be taken into consideration only if at least one other question already a document as relevant, in particular to decide between "relevant" and "potentially relevant".

The present method will not be limited to any strategy of assignment based on the received values.

Once the method has been completed, an operator may be given the option to search or browse the sets. Optionally, the candidate document "shortly before and after" (for instance in the case of a sequence of messages) can also be viewed to provide the operator with additional context. This is particularly valuable for data such as enterprise communications where previous content gives important context to the relevant piece of user data.

Device

According to a second aspect, the invention relates to the client device 1 for implementing the method according to the first aspect.

As explained, this client device 1 comprises at least data processing means 11 and a memory 12, typically device for sorting a plurality of candidate documents into several sets each associated with a reference document.

The data processor 11 is configured to implement:
(a) for each reference document
Generating a first prompt for a first large language model requesting the generation of at least one question aiming to determine whether a candidate document is relevant to the content of said reference document, said first prompt containing a text of the reference document;
Transmitting each generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for said candidate document, said second prompt containing the reference question and a text of the candidate document;
Transmitting each generated second prompt to a second server implementing the second large language model,
receiving in reply to each second prompt a value representative of the answer to the reference question;
(c) assigning each candidate document to the set associated with a reference document as a function of the values(s) that has been received for a second prompt containing a reference question associated to said reference document.

According to third aspect, the invention proposes a system comprising said client device 1, as well as a first server 2a and/or a second server 2b, respectively implement a first and/or second LLM, connected (via the network 20).

Computer Program

According to a fourth and a fifth aspect, the invention relates to a computer program product comprising code instructions for executing (on the data processing means 11 of device 1) a method according to the first aspect for sorting a plurality of candidate documents into several sets each associated with a reference document; as well as storage means readable by computer equipment (for example the memory 12 of the device 1) on which this computer program product is found.

In other words, is proposed a non-transitory computer-readable medium comprising program code instructions stored thereon for implementing a method for sorting a plurality of candidate documents into several sets each associated with a reference document, each candidate and reference document being stored by a memory of a client device, wherein the method comprises performing, by a processor of said device, steps of:
(a) for each reference document
Generating a first prompt for a first large language model requesting the generation of at least one question aiming to determine whether a candidate document is relevant to the content of said reference document, said first prompt containing a text of the reference document;
Transmitting each generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for said candidate document, said second prompt containing the reference question and a text of the candidate document;
Transmitting each generated second prompt to a second server implementing the second large language model,
receiving in reply to each second prompt a value representative of the answer to the reference question;
(c) assigning each candidate document to the set associated with a reference document as a function of the values(s) that has been received for a second prompt containing a reference question associated to said reference document.

The invention claimed is:

1. A method for sorting a plurality of candidate documents into several sets each associated with a reference document, each candidate and reference document being stored by a memory of a client device, wherein the method comprises performing, by a processor of the device, steps of:
(a) for each reference document
generating a first prompt for a first large language model requesting the generation of at least one question aiming to determine whether a candidate document is relevant to the content of the reference document, the first prompt containing a text of the reference document;
transmitting the generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for the candidate document, the second prompt containing the reference question and a text of the candidate document;
transmitting each generated second prompt to a second server implementing the second large language model;
receiving in reply to each second prompt a value representative of the answer to the reference question;
(c) assigning each candidate document to the set associated with a reference document as a function of the value(s) that has been received for a second prompt containing a reference question associated to the reference document,
wherein the text of the candidate document contained in the second prompt is the entire candidate document if it fits within performant context-window size limits of the second large language model, or else a chunk of the candidate document fitting within performant context-window size limits of the second large language model.

2. The method according to claim 1, wherein generating a first prompt includes inserting the text of the reference document into a generic template of first prompt, and generating a second prompt includes inserting the reference question and the text of the candidate document into a generic template of second prompt.

3. The method according to claim 1, wherein the first prompt requests the generation of a predefined number of questions, the predefined number of reference questions corresponding to the reference document being received in reply to the first prompt.

4. The method according to claim 3, wherein step (a) comprises merging two reference questions corresponding to the same reference document into one if it is possible.

5. The method according to claim 1, wherein the first large language model has more parameters than the second large language model.

6. The method according to claim 1, wherein step (a) previously comprises parsing the reference document with the first large language model so as to identify a summary part of the reference document, the text of the reference document contained in the first prompt being the summary part of the reference document.

7. The method according to claim 1, wherein step (a) previously comprises parsing the reference document with the first large language model so as to identify parts of the reference documents, each reference question received for the reference document being mapped on to one or more of the parts of the reference document.

8. The method according to claim 1, wherein the second prompt contains several entire candidate documents at once if it fits within performant context-window size limits of the second large language model.

9. The method according to claim 1, wherein step (b) comprises, if the value replied to a second prompt containing an entire candidate document is representative of the answer yes, restarting step (b) with several second prompts containing only a part of the candidate document.

10. The method according to claim 1, wherein the value representative of the answer to the reference question is a boolean or a score representative of the probability that the answer to the reference question is yes.

11. A client device for sorting a plurality of candidate documents into several sets each associated with a reference document, comprising a memory storing each candidate and reference document, wherein the method comprises a processor configured to implement:
(a) for each reference document
generating a first prompt for a first large language model requesting the generation of at least one question aiming to determine whether a candidate document is relevant to the content of the reference document, the first prompt containing a text of the reference document;
transmitting each generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for the candidate document, the second prompt containing the reference question and a text of the candidate document;
transmitting each generated second prompt to a second server implementing the second large language model,
receiving in reply to each second prompt a value representative of the answer to the reference question;
(c) assigning each candidate document to the set associated with a reference document as a function of the values(s) that has been received for a second prompt containing a reference question associated to the reference document,
wherein the text of the candidate document contained in the second prompt is the entire candidate document if it fits within performant context-window size limits of the second large language model, or else a chunk of the candidate document fitting within performant context-window size limits of the second large language model.

12. A non-transitory computer-readable medium comprising program code instructions stored thereon for implementing a method for sorting a plurality of candidate documents into several sets each associated with a reference document, each candidate and reference document being stored by a memory of a client device, wherein the method comprises performing, by a processor of the device, steps of:
(a) for each reference document
generated a first prompt for a first large language model requesting the generation of at least one question aiming to determine whether a candidate document is relevant to the content of the reference document, the first prompt containing a text of the reference document;
transmitting each generated first prompt to a first server implementing the first large language model;
receiving in reply to the first prompt at least one reference question corresponding to the reference document;
(b) for each candidate document,
generating at least one second prompt for a second large language model requesting the answer to at least one of the reference questions for the candidate document, the second prompt containing the reference question and a text of the candidate document;
transmitting each generated second prompt to a second server implementing the second large language model,
receiving in reply to each second prompt a value representative of the answer to the reference question;
(c) assigning each candidate document to the set associated with a reference document as a function of the values(s) that has been received for a second prompt containing a reference question associated to the reference document,
wherein the text of the candidate document contained in the second prompt is the entire candidate document if it fits within performant context-window size limits of the second large language model, or else a chunk of the candidate document fitting within performant context-window size limits of the second large language model.

* * * * *